United States Patent [19]

Xiang-Wei

[11] Patent Number: 4,872,475
[45] Date of Patent: Oct. 10, 1989

[54] ADJUSTABLE DIFFERENTIAL FLOW SHUTTLE VALVE

[76] Inventor: Zeng Xiang-Wei, 11 4th Block South Renmin Road, Chengdu, Sichuan Province, China

[21] Appl. No.: 184,741
[22] Filed: Apr. 22, 1988
[30] Foreign Application Priority Data Apr. 28, 1987 [CN] China .............................. 87103004-2

[51] Int. Cl.$^4$ ........................ F16K 15/02; F16K 17/26
[52] U.S. Cl. .................................. 137/493; 137/493.8; 137/516.25
[58] Field of Search .................. 137/493, 493.1, 493.9, 137/516.25, 625.3, 625.37, 516.11, 493.8

[56] References Cited

U.S. PATENT DOCUMENTS

| | | | |
|---|---|---|---|
| 2,071,969 | 2/1937 | Diescher | 137/493 X |
| 2,776,673 | 1/1957 | Goodman et al. | 137/493 |
| 2,932,316 | 4/1960 | Stanton | 137/516.25 X |
| 3,521,662 | 7/1970 | Bache | 137/493.9 X |
| 3,683,957 | 8/1972 | Sands | 137/516.25 X |
| 3,850,195 | 11/1974 | Olsson | 137/493 X |

OTHER PUBLICATIONS

Hydraulic and Pneumatic Handbook, published by Machinery Industry Publishing House of China, Nov. 1984, Beijing First Edition, p. 330.
Hydraulic Technology Handbook, Published by Kichikawa Ikutaro, Publishing House of Japan Periodical Industrial News Agency, Jan. 30, 1976, First Edition p. 1163.

Primary Examiner—Stephen Hepperle
Attorney, Agent, or Firm—Armstrong, Nikaido, Marmelstein, Kubovcik & Murray

[57] ABSTRACT

The present invention is a one-way fluid valve which consists of a shuttle chamber (29) with its two ends connected with the two fluid openings (22,22'), a shell (2) incorporating a by-pass (20) which is connected with the two ends of the shuttle chamber, a plunger (1) inserted in the shuttle chamber, and two throttling control elements (3,3') placed at the two ends of shuttle chamber used for controlling the stroke of the plunger. This kind of shuttle valve may be installed in a single pipe-line, the fluid may flow through it in forward and backward directions. It has the function of regulating the flow-rate of fluid forward and backward, hence is able to handle unequal flow-rates forward and backward. It can also function as one-way non-return valve, two-way alternating non-return valve and can be totally shut and fully opened. This kind of shuttle valve is applicable to a wide range of pressures and flow-rates, especially suitable for high pressure and high flow rate systems, and is readily adaptable for automatic control, and can be easily fabricated.

11 Claims, 5 Drawing Sheets

A - A

B - B

F-F

G-G

H-H

J-J

I-I

S – S

U – U

T – T

ADJUSTABLE DIFFERENTIAL FLOW SHUTTLE VALVE

TECHNICAL FIELD

The present invention relates to a kind of basic fluid element, especially to a kind of one-way valve.

BACKGROUND OF THE INVENTION

The prior-art shuttle valve is a one way valve, as described in the "Hydraulic and Pneumatic handbook" (edited by Hydraulic and Pneumatic association of Japan, translated by "Hydraulic and Pneumatic Handbook" translator group, Published by Machinery Industry Publishing House of China, November 1984, P.330) and "Hydraulic Technology handbook-Revised New Edition" (edited by Hydraulic Technology handbook Editorial Committee of Japan, Published by Japan Periodical Industrial News Agency, in the year 1976, P. 1163) (FIGS. 1, 2). The prior-art shuttle valve comprises a shell (2), a steel ball (11) and a shuttle chamber (29) within the central part of the shell, the two ends of the shuttle chamber are connected respectively with the two fluid openings (22) and (22'), and the middle part of the shuttle chamber is connectd with a fluid outlet (21); the steel ball is placed within the shuttle chamber of the shell, it can be moved by the pressurized fluid entering from the fluid opening (22) or (22'), it automatically seals off the fluid opening at the lower pressure side, preventing the fluid from entering the valve from this side, thereby lets the higher pressure fluid flow through the shuttle chamber to the fluid outlet (21). This kind of shuttle valve is capable of selecting the fluid access automatically with respect to the fluid pressure, i.e. automatically seals off one fluid access and connects with the other. It has the function of an automatic alternating non-return valve. But with this kind of shuttle valve the fluid passing through it can not flow reversely, and the flow-rate of the fluid can not be regulated.

SUMMARY OF THE INVENTION

The object of the present invention is to provide a kind of shuttle valve, with which the fluid can flow forward and backward, the flow-rate of the fluid can be regulated, and unequal flow-rates can be attained between the forward and backward fluid flow. According to the present invention of the shuttle valve, throttling control elements are provided at the two ends of the shuttle chamber for controlling the stroke of the shuttle, and also a by-pass with its two ends connected between the two ends of the shuttle chamber. The fluid can only flow through the by-pass but not the shuttle chamber. By means of the coordinated action of the throttling control elements and the shuttle, the functions of the present invention are realized.

DETAILED DESCRIPTION OF THE INVENTION

According to the present invention of adjustable differential flow shuttle valve (FIGS. 3-27), it consists of fluid openings for connection with the pipe-lines, a shuttle chamber (29), connected with the fluid openings, a shell (2), and a sliding plunger (1) in the shuttle chamber used as a shuttle. This shuttle valve has only two fluid openings disposed respectively at the two ends of the shell in connection with the two ends of the shuttle chamber, and at least one by-pass (20) with its two ends connected respectively with the two ends of the shuttle chamber, and two throttling control elements (3,3') installed respectively at the junction of the by-pass and the shuttle chamber. The fluid openings (22,22') may be oriented coaxially or substantially coaxially with the shuttle chamber. The fluid openings (21,21') can also be disposed in a direction substantially perpendicular to the shuttle chamber. The by-pass (20) may be corporated within the shell; it may also be an external pipe (20') connected to the shell. At the jucntion of the by-pass and the shuttle chamber, internal ring-grooves (27, 28) may be laid circumferentially in the inner surface, as is shown in FIG. 5. The throttling control element may be a regulating ring (32, 32') comprising a central passage (34) and radial passages (35), and is connected to the shell with an adjustable joint (FIG. 5). It may also be a regulated rod (31, 31') with a cylindrical rod end (311), the sectional area of which is smaller than that of the fluid opening and the shuttle chamber, the joint of the regulating rod and the shell is adjustable (FIGS. 10, 11, 12). It may also have at least one limiting block (30,30') rigidly or adjustably joined with the shell (FIGS. 14, 16). The adjustable joint adopted may be of a screwed-in type to be adjusted rotatively, or it may also be a type of sliding blocks in grooves to be adjusted with push-pull or rotative means. According to the present invention of the adjustable differential flow shuttle valve, it has two entirely symmetrical left and right halves, and can be arbitrarily installed in single pipe-line (FIGS. 3,4). By adjusting and changing the position of the throttling control elements (3,3'), the stroke of the sliding plunger (1) in the shuttle chamber (29) can be changed, enabling the plunger to obstruct or uncover the opening of the by-pass (20), thereby changing the width of the latter and thus changing the flow-rate of fluid through this shuttle valve. For the purpose of explanation, suppose the maximum adjustable displacement of the throttling element is S, and its actual adjusted displacement, i.e. the distance between the throttling control elements (3,3') and the corresponding ends of the shuttle chamber (29) is respectively a and b (See FIGS. 3 and 4). Suppose the fluid flow forward, i.e. it enters the fluid opening (22') and flows out from the fluid opening (22), the flow-rate of the fluid will be Q; when the fluid flows backward, i.e. it enters the fluid opening (22) and flows out from the fluid opening (22'), the flow-rate of the fluid will be Q'. The working principle of this shuttle valve is as follows: When the fluid flows forward, the fluid enters fluid opening (22') from the pipe-line, pushes the plunger (1) to slide within the shuttle chamber until it contacts the throttling control element (3), causing the plunger to obstruct the opening of by-pass (20), by a distance s-a, the uncovered part of the opening being a; at the same time, fluid passes through the by-pass (20), flows out from the fluid opening (22) into the pipe-line, the flow rate of the fluid will be Q. When the fluid flows backward, the fluid flows from the pipeline and enters the fluid opening (22), pushes the plunger (1) to slide within the shuttle chamber until it contacts the throttling control element (3'), causing the plunger to obstruct the opening of the by-pass (20) by a distance s-b, the uncovered part of the opening being b; at the same time, the fluid passes through the by-pass (20), flows out from the fluid opening (22') and enters the pipe- line, the flow-rate of the fluid will be Q'. By regulating and changing the positions of the throttling control elements (3,3), the magnitude of a,b will be changed, whereby the following modes of operation can be achieved, which will depict the various functions of this shuttle valve:

1. When "a" is increased, "Q" also increases, the forward flow-rate is adjustable.
2. When "b" is increased, "Q" also increases, the backward flow-rate is adjustable.
3. When a=0, Q=0, forward flow is cut off but backward flow is possible, thus it serves as a non-return valve.
4. When b=0, Q'=0, forward flow is possible but backward flow is cut off, thus it serves as a non-return valve in the other direction.
5. When a=S, Q will be maximum, forward flow is unobstructed.
6. When b=S, Q' will be maximum, backward flow is unobstructed.
7. When a=b, Q=Q', forward and backward flow will be equal.
8. When a >b, Q >Q', forward and backward flow-rates will differentiate from each other, the forward flow-rate will be greater than that of backward.
9. When a<b, Q<Q', foward and backward flow-rates will differentiate from each other, the forward flow-rate will be smaller than that of backward.
10. When a=b=o, Q=Q'=0, forward and backward flow will both be cut off, i.e. the valve is fully shut.
11. When a=b=s, Q=Q', the value attains its maximum opening, forward and backward flow will be unobstructed, i.e. the valve is fully open.

According to the present invention of the adjustable differential flow shuttle valve, it possesses the folowing remarkable advantages and obvious effects:

1. The fluid passing through this shuttle valve may flow forward and backward. By regulating the throttling control elements, the rate of forward and backward flow can be regulated, thus equal and differentiated foward and backward flow can be obtained. As the joints between the throtting control elements and the shell can be of the fixed type or can be adjustable by means of screw threads or by sliding blocks in grooves, thus the regulation of the flow can be stepped or stepless. Whilst in the prior-art shuttle valves, there are no throttling control elements, so the regulation of flow can not be accomplished.

2. By the regulation of the throttling control elements in the present shuttle valve, the function of forward or backward non-return flow can be achieved. Also no-resistance flow in both directions and cut off functions can be effected, i.e. the valve can function as a stop valve.

3. When the embodiment of this shuttle valve has openings coaxial with the shuttle chamber, and the by-pass is closely adjacent to the shuttle chamber, the direction of flow does not change much, therefore its local pressure loss is relatively small. On the contrary, the flow direction in the prior-art shuttle valve must have a right angle turn, therefore its local pressure loss is much larger.

4. In the present shuttle valve, there are only two fluid openings, the configuration of the pipe-line is relatively simple; but in the prior-art shuttle valve, there are three fluid openings, the configuration of the connected pipe-line is relatively complicated. The shuttle of the present shuttle valve can have the form of a cylindrical plunger, so it is relatively easy to fabricate, its operation is more reliable, and the range of applicable fluid pressures and flow-rates may be very wide, it is especially applicable in the high pressure, high flow-rate systems. The shuttle of the prior-art shuttle valve is a steel ball, the contact surface of the ball and the seat in the shuttle chamber is spherical, which demands high precision in processing, hence it is difficult to fabricate. If the prior-art shuttle valve is to be applied in high pressure, high flow-rate systems, great difficulties will be encountered in its fabrication, threfore its applicable range of fluid pressures and flow-rates is small.

5. According to the present invention of shuttle valve, the operation of its throttling control elements can be integrated into a system of pressure transducer, electronic computer, manipulator, servomotor etc., thus achieving fully automatic control of the shuttle valve.

6. According to the present invention of shuttle valve, it is applicable in the transportation and accumulation system and so on of all kinds of fluid such as oil, gas and water. It is especially applicable in the arrangements where the throttled flow, alternately non-return function, and automatic control are simultaneously required. For example, take one type of adjsutable differential flow shuttle valve of the present invention to be installed in an existing pressurized towerless water-supply system with the shuttle valve installed between the accumulator and the main water supply system. Owing to the function of the present shuttle valve, divided flow supplied by the water pump to the accumulator can be greatly decreased, and the duration of continuous operation of the water pump supply water to the users can be greatly lengthened. Thereby the present mode of water supply with the water pump and accumulator alternately operating may be changed into another mode of water supply by the pump as the main and the accumulator as the auxiliary source. It thus makes the water supply pressure more stable, equipments faults will decrease, and the capacity of the accumulator can be greatly reduced, generally about eighty percent as compared with the original capacity. Besides, the size of both the water pump and its motor may be reduced by fifty percent or so as compared with the original. In the following, a detailed description of the present invention with examples of its embodiment and with reference to its drawings will be given.

DESCRIPTION OF THE PREFERRED EMBODIMENTS

Embodiment 1

Figure 1:
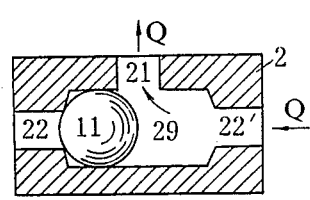
FIGS. 1, 2 are the schematic drawings of the construction and working principle of the prior-art shuttle valve.
Figure 3:
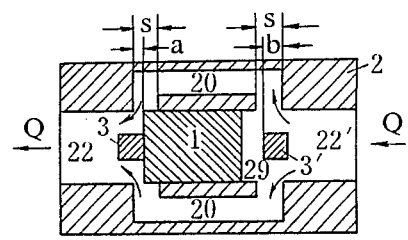
FIGS. 3, 4 are the schematic drawings of the construction and working principle of the adjustable differential flow shuttle valve according to the present invention.
Figure 2:
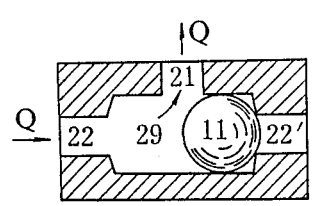
Figure 4:
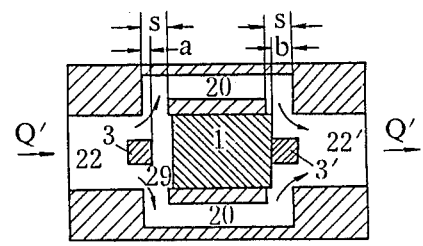
Figure 5:
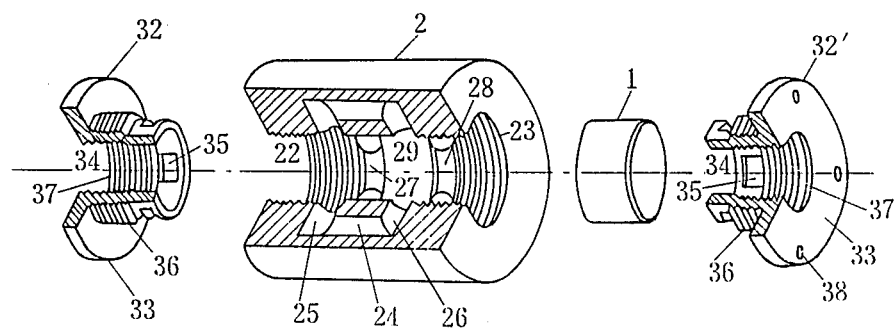
FIG. 5 is an exploded view of one kind of adjustable differential flow shuttle valve according to the present invention. It displays the construction of the fluid openings coaxial with the shell, the by-pass, the internal ring-groove and the regulating ring.
Figure 6:
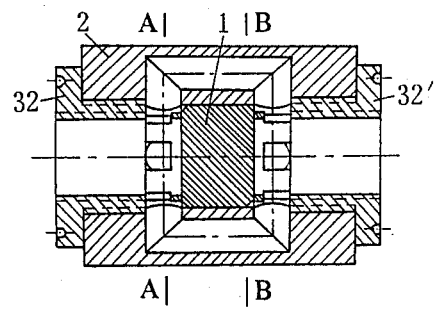
FIGS. 6–8 are the three view drawings of FIG. 5.
Figure 9:
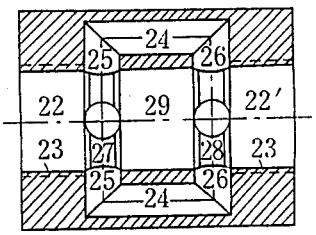
FIG. 9 is the sectional view of the shell of the shuttle valve.
Figure 7:
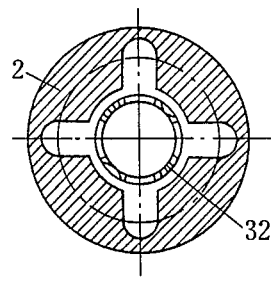
Figure 8:
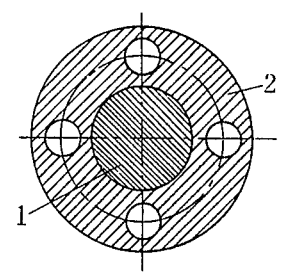

In this embodiment of the present invention of adjustable differential flow shuttle valve (FIGS. 5–9), it comprises a shell (2), a plunger (1), and two identical regulating rings (32,32'). The shell (2) is similar to a thick walled hollow cylinder. At its central part there is a shuttle chamber (29) in the shape of a straight cylindrical hole coaxial with the external cylindrical surface. The two ends of the shuttle chamber are connected substantially in a straight line with two circular sectioned fluid openings (22,22'). Within the cylindrical wall at the central part of the shell with the shuttle chamber, there are four equally spaced by-pass canals (20) having a circular section. Each by-pass canal is composed of one axial passage (24) and two radial passages (25,26). The axial passage (24) is substantially paralell with the shuttle chamber. The radial passages (25,26) are disposed around the shuttle chamber in radial directions, with one end of each being substantially perpendicularly connected with the two ends of the respective axial passage (24) and the other ends of each being substantially perpendicularly connected with the two ends of the shuttle chamber. Between the openings of the radial passages in the shuttle chamber, ring-grooves (27,28) are formed circumferentially on the inner surface respectively. The pitch diameter of the internal ring-groove is larger than the diameter of the shuttle chamber, the width of the groove is equal to or larger than that of the by-pass canals. The plunger (1) is placed in the shuttle chamber (29) of the shell, its external shape is similar to a short cylindrical body, its length and diameter should fit well with the shuttle chamber, such that the plunger not only can seal off the shuttle chamber, but can also slide freely within the shuttle chamber along its axial direction. Depending upon the kind, the pressure and flow-rate of the fluid, the working conditions and requirements etc., this plunger can be made of a solid body, a hollow body, a latticed hollow body, or made of light-weight material. The regulating rings (32, 32') are similar to a hollow bolt, its central part is a through passage (34), its one end has an internal screw thread (37) forming the joint with the pipeline. At this end of the regulating ring there may be a flange (33), on which four equally spaced blind holes (38) may be drilled for regulating by hand. It can also be designed to be connected with a manipulator or servomotor, for example, by gear drive and so on, thus automatic control can be effected through the use of an electronic computer and transducers. On the cylindrical part of the other end of the regulating ring, there are four equally spaced radial passages (35) on its periphery, their position and dimension are well coordinated with that of the by-pass or the internal ring-groove, and can be made in the form of square or circular holes, or notched end. These regulating rings (32,32') are adjustably joined within the respective fluid openings (22, 22') at the two ends of the shell. The adjustable joint may be a screw joint, i.e. the internal surface of the fluid opening has an internal screw thread (23), and the external surfaces of the regulating ring has a mating external screw thread (36). When the regulating ring has a flange, it is only partly assembled into the fluid opening. The fluid pipe (not shown in the figure) is connected with the internal screw thread (37), i.e. the fluid pipe joins with the regulating ring. When the regulating ring does not have a flange, then it can be entirely assembled into the fluid opening, the fluid pipe can be directly joined by its external screw thread with the internal screw thread (23) of the fluid opening of the shell. Besides, the adjustable joint may also be a type of joint with a sliding block in a groove. (FIGS. 24-27), this sliding type joint may be designed with at least one stud and its nut (39) being rigidly fixed to the external surface of the regulating ring, and at the corresponding part of the shell, there may be cut a straight sliding slot (231) or spiral sliding slot (232) for guiding the stud. The stud can slide within the sliding slot and be fixed at its position by the nut. It may be operated by hand, and can also be operated automatically by a lever or a manipulator.

Embodiment 2

Figure 21:
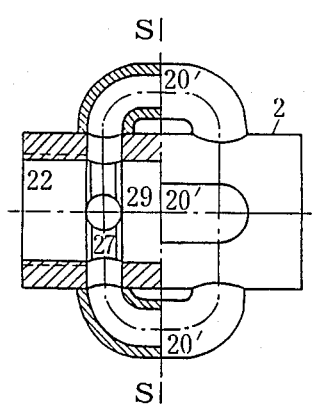
FIGS. 21–23 are the constuctional schematic drawings of two kinds of the shell of the shuttle valve of the present invention. It displays the construction of the external by-pass pipes, fluid openings, and the internal ring-grooves.
Figure 19:
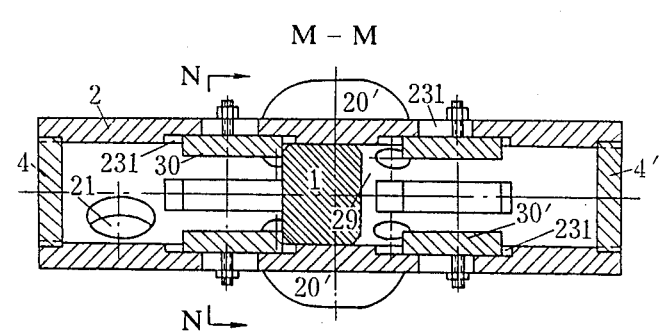
Figure 22:
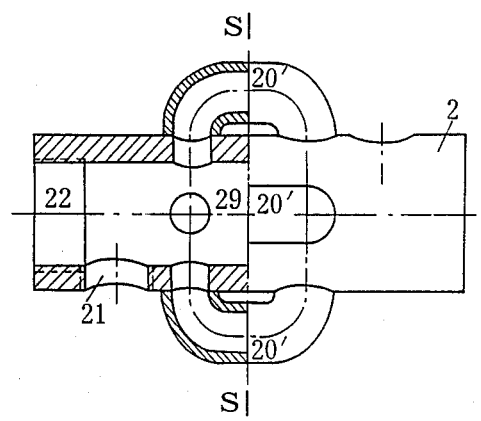
Figure 23:
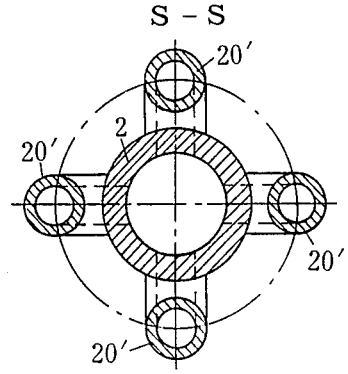
Figure 24:
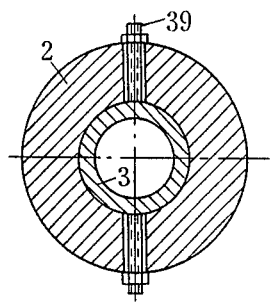
FIGS. 24, 25 are the schematic drawings of the construction of the regulating elements of the shuttle valve of the present invention. It displays the straight sliding groove.
Figure 25:
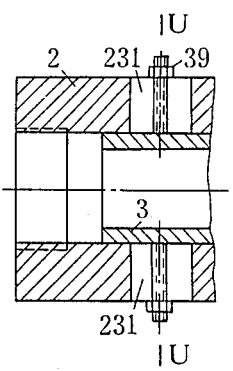
Figure 26:
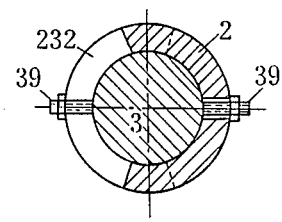
FIGS. 26, 27 are the schematic drawings of an another construction of the regulating elements of the shuttle valve of the present invention. It displays the spiral sliding groove.
Figure 27:
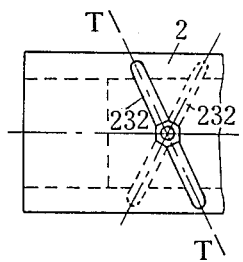

In this embodiment of the present invention of adjustable differential flow shuttle valve, its construction is basically the same as Embodiment 1. The difference lies in that the by-passes set up on the shell (2) are four equally spaced external pipes (20') connected with the shell (FIGS. 21,22,23).

Embdiment 3

Figure 10:
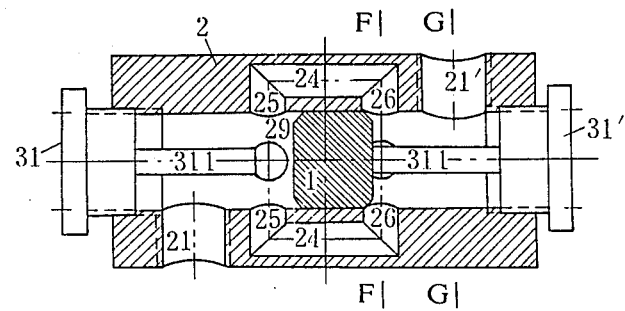
FIGS. 10–12 are the constructional schematic drawings of another version of the adjustable differential flow shuttle valve according to the present invention. It displays the construction of the vertical fluid openings in the shell, the by-pass and the regulating rod.
Figure 11:
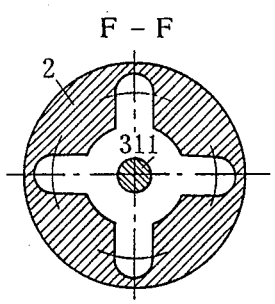
Figure 12:
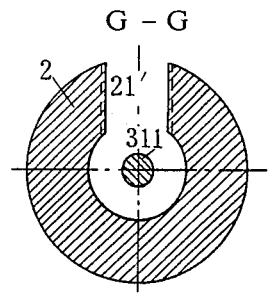
Figure 13:
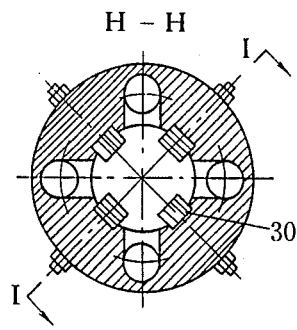
FIGS. 13–16 are the constructional schematic drawings of a further version of the adjustable differential flow shuttle valve of the present invention. It displays the construction of the fluid openings coaxial with the shell, the by-pass and the limiting blocks.
Figure 14:
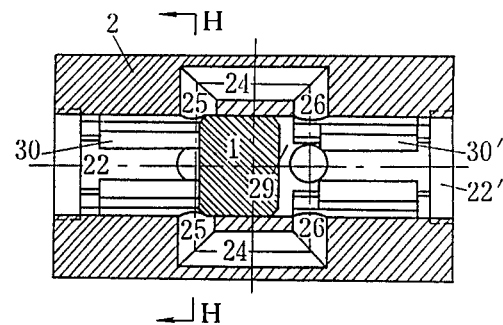
Figure 15:
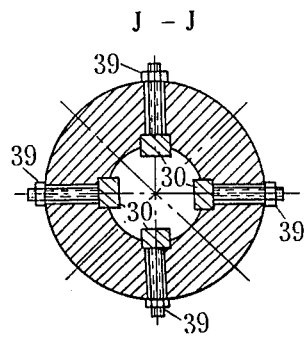
Figure 16:
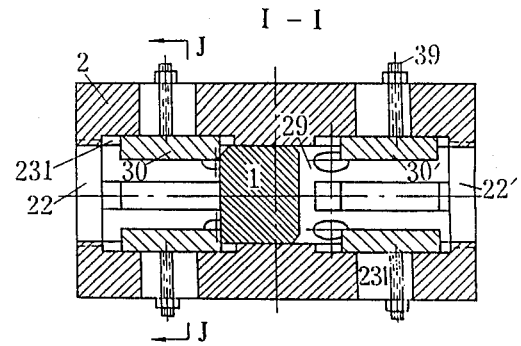
Figure 17:
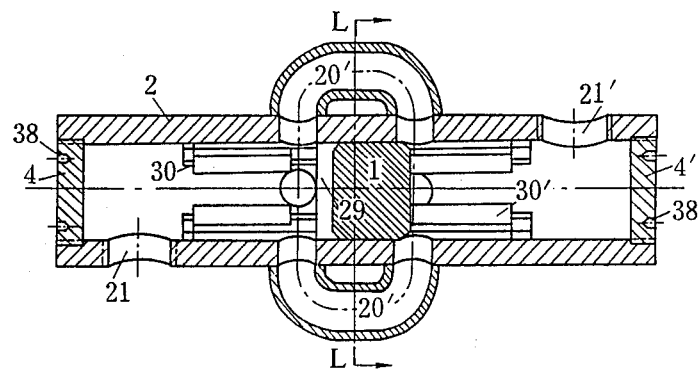
FIGS. 17–20 are the constructional schematic drawings of another version of the adjustable differential flow shuttle valve of the present invention. It displays the construction of the vertical fluid openings in the shell, external by-pass pipes and the limiting blocks. If the plugs (4,4') are removed and the vertical fluid openings (21,21') are blocked, then it can be changed into a valve with its fluid openings coaxial with the shell.
Figure 18:
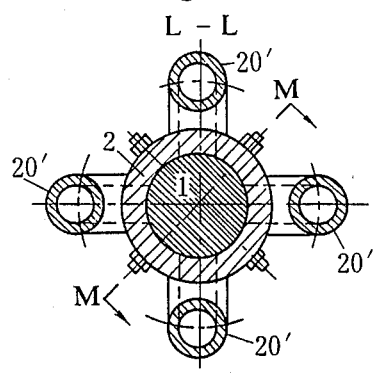
Figure 20:
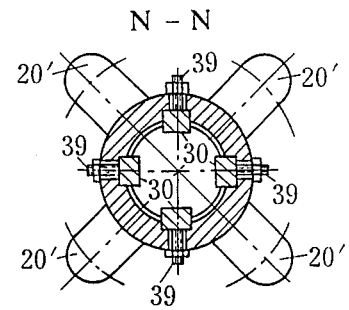

In this embodiment of the present invention of adjustable differential flow shuttle valve (FIGS. 10–12), its construction is essentially the same as Embodiment 1. The difference lies in that the two fluid openings (21, 21') on the shell are substantially perpendicularly disposed in the shuttle chamber (29). At the two ends of the shuttle chamber there are no internal ring-grooves. The throttling control elements (31,31') are regulating rods with a rod end (311) touchable by the plunger (1). The joint between the regulating rod and shell is similar to that of Embodiment 1.

Embodiment 4

In this embodiment of the present invention of adjustable differential flow shuttle valve, its construction is basically the same as Embodiment 3. The difference lies in that by-passes on the shell (2) are four equally spaced external by-pass pipes (20') connected with the shell. (FIGS. 21,22,23).

Embodiment 5

In this embodiment of the present invention of adjustable differential flow shuttle valve (FIGS. 13–16), its construction is essentially the same as Embodiment 1. The difference lies in that there are no internal ringgrooves in the shell (2). The throttling control elements (30,30') are four equally disposed limiting blocks connected with the shell by rigid or adjustable joints. The adjustable joint may be a straight sliding groove (231) in the shell at the corresponding positions of the limiting blocks. The straight sliding groove comprises a concave groove capable of receiving the limiting block to slide in, and a control slot is rigidly joined with the limiting block. The limiting block can be moved along the axial direction in the straight sliding groove by means of the stud and is fixed in its position by the nut.

Embodiment 6

In the embodiment of the present invention of adjustable differential flow shuttle valve [FIGS. 17–20], its construction is basically the same as Embodiment 5. The difference lies in that the by-passes on the shell [20] are four equally spaced external by-pass pipes [20] connected with the shell. The fluid openings [21, 21'] at two ends of the shell are substantially perpendicularly disposed with the shuttle chamber [29]. The two ends of the shell along the axial direction of the shuttle chamber may be solidly sealed, or it may also be closed by plugs [4, 4']. If the plugs are removed, then the two ends of the shell can be used as coaxial fluid openings.

What is claimed is:

1. Adjustable differential flow shuttle valve comprising a shell having fluid openings for connection with pipe-lines, and a shuttle chamber connected with the fluid openings, and a plunger slidably enclosed in the shuttle chamber, wherein only two fluid openings are provided respectively at the two ends of the shell and connected with the two ends of the shuttle chamber, at least one by-pass connects the two ends of the shuttle chamber around the shuttle chamber for entire fluid flow through said valve, and two throttling control elements are placed at the two juntions of the by-pass and the shuttle chamber controlling the stroke of the plunger.

2. Adjustable differential flow shuttle valve according to claim 1 wherein said fluid openings are coaxially disposed with the shuttle chamber, said at least one by-pass is at least one passage incorporated with the shell, said shell further having, at the junctions of the by-pass and the shuttle chamber, ringgrooves provided circumferentially along an inner surface thereof, said throttling control elements are regulating rings comprising a central passage and radial passages, the joints of the regulating rings with the shell are adjustable.

3. Adjustable differential flow shuttle valve according to claim 1, wherein said fluid openings are coaxially disposed with the shuttle chamber, said at least one by-pass is at least one external passage connected with the shell, said shell has, at the junctions of the by-pass and the shuttle chamber, ringgrooves provided circumferentially along an inner surface thereof, said throttling control elements are regulating rings comprising a central passage and radial passages, the joints of the regulating rings with the shell are adjustable.

4. Adjustable differential flow shuttle valve according to claim 1 wherein said fluid openings are disposed substantially perpendicular to the shuttle chamber, said at least one by-pass is at least one passage incorporated within the shell, said throttling control elements are regulating rods each with a rod end whose sectional area is smaller than that of the fluid opening and shuttle chamber, the joint of the regulating rods with the shell are adjustable.

5. Adjustable differential flow shuttle valve according to claim 1, wherein said fluid openings are disposed substantially perpendicular to the shuttle chamber, said at least one by-pass is at least one external pipe connected with the shell, said throttling control elements are regulating rods each with a rod end whose sectional area is smaller than that of the fluid opening and the shuttle chamber, the joints of the regulating rods with the shell are adjustable.

6. Adjustable differential flow shuttle valve according to claim 1, wherein said fluid openings are coaxially disposed with the shuttle chamber, said at least one by-pass is at least one passage incorporated within the shell, said throttling control elements have at least one limiting block, the joints of the limiting block with the shell are adjustable.

7. Adjustable differential flow shuttle valve according to claim 1, wherein said fluid openings are disposed substantially perpendicular to the shuttle chamber, said at least one by-pass is at least one external pipe connected with the shell, said throttling control elements have at least one limiting block, the joints of the limiting blocks with the shell are adjustable.

8. Adjustable differential flow shuttle valve according to any one of claims 2 to 5, wherein said adjustable joint is a screw threaded joint.

9. Adjustable differential flow shuttle valve according to any one of claims 2 to 7, wherein said adjustable joint is a type of joint with a sliding block in a sliding groove.

10. Adjustable differential flow shuttle valve according to claim 1, wherein said fluid openings are coaxially disposed with the shuttle chamber, said at least one by-pass is at least one passage incorporated within the shell, said throttling control elements have at least one limiting block, the joints of the limiting blocks with the shell are fixed.

11. Adjustable differential flow shuttle valve according to claim 1, wherein said fluid openings are disposed substantially perpendicular to the shuttle chamber, said at least one by-pass is at least one external pipe connected with the shell, said throttling control elements have at least one limiting block the joints of the limiting blocks with the shell are fixed.

* * * * *